March 5, 1974    TOSHISO KAMAI    3,795,545
LEAK-PROOF ZINC CHLORIDE DRY CELL
Filed Oct. 19, 1970
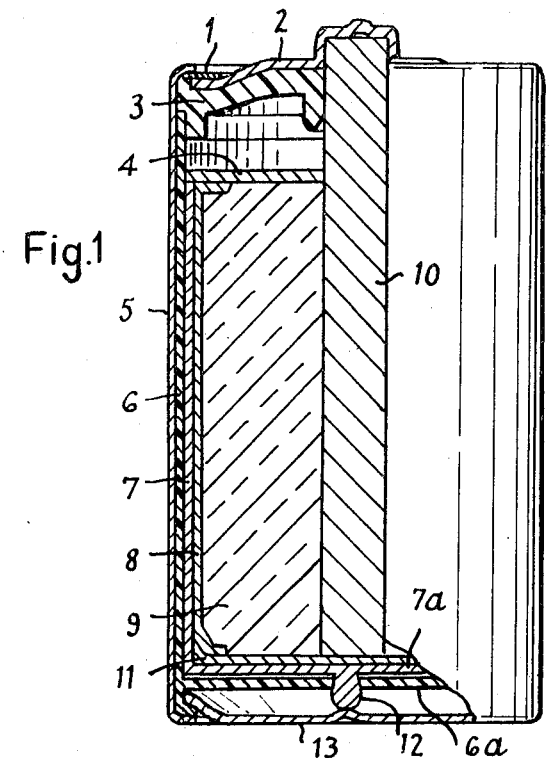
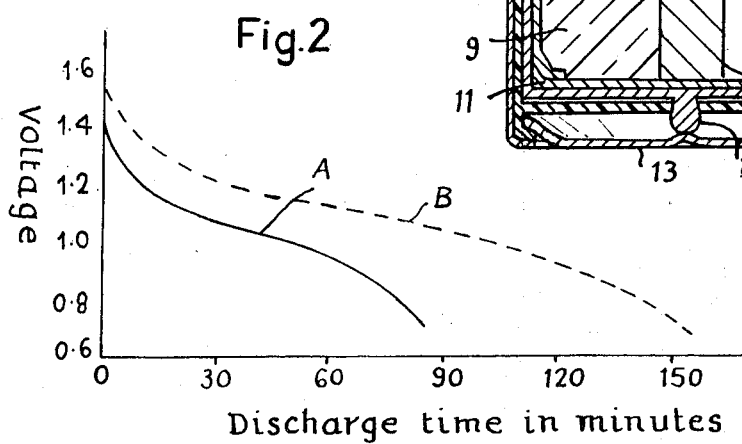
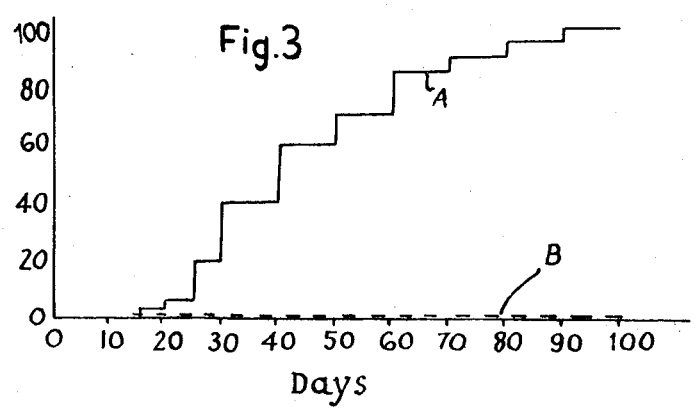
Inventor
T. KAMAI
By
Holcombe, Wetherill + Brisebois
Attorney { # 3,795,545
LEAK-PROOF ZINC CHLORIDE DRY CELL
Toshiso Kamai, Midorigaoka Mansion 703,
Midorigaoka 1-chome 19–7, Tokyo, Japan
Filed Oct. 19, 1970, Ser. No. 82,050
Claims priority, application Japan, Oct. 27, 1969,
44/85,704; Jan. 28, 1970, 45/1,864
Int. Cl. H01m 21/00
U.S. Cl. 136—107                 9 Claims

ABSTRACT OF THE DISCLOSURE

The invention relates to a leak-proof dry cell in which the zinc cathode canister is enclosed in a plastics casing and the electrolyte solution consists mainly of zinc chloride with a small proportion of ammonium chloride whereby the production of fine complex crystals is avoided. The zinc canister is thin-walled so that it is consumed by the time the cell voltage drops below its useful voltage. This avoids the production of hydrogen gas as well as a saving of zinc. The zinc canister is connected to its outer terminal by a zinc peg or rivet on its base which passes through a hole in the bottom of the plastics casing.

SUMMARY OF THE INVENTION

The present invention relates to an electrical dry cell having a zinc cathode, from which leakage of electrolyte is eliminated.

Known Leclanche dry cells have the inherent disadvantage that the electrolyte easily leaks out after a short-circuit or prolonged use. Having carefully examined the problem, I have ascertained that electrolyte leakage is caused for the following reasons.

Known Leclanche dry cells have the inherent disadvantage the electrolyte and a zinc canister as the cathode, and during discharge the zinc cathode is decomposed and fine zinc di-ammonium chloride crystals $Zn(NH_3)_2Cl_2$ are produced. These fine crystals, which form a semitransparent layer on the surface of the zinc, press the zinc chloride which exists on the side of the cathode outwardly by osmotic pressure. Furthermore, in known Leclanche dry cells, the zinc canister also serves the container for the internal components of the cell. A large number of small holes are produced on the surface of the canister during discharge by consumption of the zinc, which can allow leakage of the electrolyte and other fluid materials. Furthermore a large amount of zinc remains even after the voltage of the cell has dropped below its useful service voltage and particularly when the circuit remains closed for a long time or if the cell is under load for a long time, since oxidation by the manganese oxide stops and hydrogen gas is produced. And this hydrogen gas, when produced, expels fluid from the electrolyte past the seal at the top of the cell and through the holes in the zinc canister and also from the base. Thus is caused the so-called leakage of the electrolyte.

As a result of these investigations into the causes of electrolyte leakage, I have devised an electrolyte solution, of which zinc chloride forms the main constituent and which avoids the production of the undesirable fine crystals, and a modified cell construction which avoids the production of hydrogen gas.

The present invention consists in a dry cell comprising an enclosing casing of liquid impervious material, a cathode consisting of a sleeve or canister of zinc within said casing, a carbon anode within said cathode and insulated therefrom, and a depolarizer-electrolyte between the cathode and anode and comprising a depolarizer mixed with an electrolyte solution comprising, in addition to water, zinc chloride as the main constituent and ammonium chloride, the quantity of zinc forming the cathode being such that the zinc is substantially consumed by the time the cell voltage drops below its useful voltage, and anode and cathode terminal means outside said casing and connected to said anode and cathode respectively.

One of the features of this invention consists in that, in addition to water, 20 to 30% of zinc chloride is used for the electrolyte to which 5 to 20% of ammonium chloride is added, and these are kneaded or masticated with the depolarizer in such a manner that the water is reduced to about 20–35%.

Since the addition of a small quantity of ammonium chloride considerably increases the discharge capacity of the cell, the use thereof is an advantage to a limited degree, but if the same ammonium chloride is added in solid form or if this material is dissolved in the electrolyte solution substantially to saturation, then fine crystallization thereof easily occurs, which is not desirable.

Further with this composition of the electrolyte its nature is very different from that of the normal depolarizer cake. It is necessary to use more moisture than in the cake of the known Leclanche cell to facilitate diffusion of the ions. In addition, sufficient kneading must be carried out after mixing. If only a small quantity of ammonium chloride is used in this manner, the chlorin part, which together with the ammonium produces and deposits the complex salt, remains only trivial while the activity of the chloride ions remains unchanged even with repeated discharges. Therefore, by means of the above mentioned procedure, a high-capacity cell or battery can be obtained.

A cell made in this manner allows hardly any electrolyte solution to escape into the air gap part of the battery, but if zinc from the cathode casing still remains after the cell voltage has dropped below its useful voltage, hydrogen gas is produced in the last stage of discharge. To avoid this, according to another feature of the invention, the quantity of zinc used for the cathode is so chosen that it is consumed through use by the time the voltage drops below the useful voltage so that the production of hydrogen gas cannot thereafter occur and generation of gas pressure promoting leakage of the electrolyte is prevented.

To this end the zinc canister (which in the cell of the invention may alternatively be in the form of a sleeve) is enclosed within an outer casting of liquid-impermeable material, preferably a plastics material such as polyethylene, through the wall of which electrical connection is made to the zinc canister or shell, conveniently by a zinc peg or rivet. The wall thickness of the zinc canister or shell is relatively thin so that the zinc is consumed at least by the time the cell voltage would normally drop below a useful service voltage. This not only avoids the production of hydrogen gas but also effects a saving in the quantity of zinc required for the cathode. The zinc cathode need not extend above the height of the electrolyte paste in the cell, thereby saving the quantity of zinc normally used to form the top of the cathode canister which does not contribute to the capacity of the cell. By these savings in zinc the manufacturing costs of the cell can be reduced.

BRIEF DESCRIPTION OF THE DRAWINGS

In order that the invention may be more clearly understood, an embodiment thereof will now be described with reference to the accompanying drawing, in which:

FIG. 1 is a vertical section through a dry cell according to the invention,

FIG. 2 is a graph showing the discharge curve of a dry cell according to the invention compared with that of a known dry cell of the Leclanche type, FIG. 3 is a graph comparing the leakage of electrolyte over a period of time from dry cells according to the invention and of the known Leclanche type.

DETAILED DESCRIPTION OF THE DRAWINGS

FIG. 1 is a vertical section through a dry cell according to the invention. A zinc cathode canister 7 of cylindrical shape and having a bottom wall 7a fits within a casing 6 of polyethylene or other suitable plastics material which is closed at its top by a cover plate 3 of plastics material, the cover plate 3 and casing 6 being heat-sealed or otherwise joined together in a liquid-tight manner. The bottom 7a of the zinc canister is provided with an integral peg or rivet 12 which passes through an opening in the bottom wall 6a of the plastic casing. If desired an adhesive sealant may be applied to assist in avoiding leakage past the peg or rivet 12 which serves for making an external electrical connection to the zinc cathode.

The interior surfaces of the zinc canister are covered by a base disc 11 and sleeve 8 of gummed paper within which is the depolarizer paste 9. A carbon rod anode is inserted into the middle of the depolarizer paste and a paper disc 4 is pressed down on to the top of the paste only to such an extent that the fluid of the depolarizer paste can not escape upwardly.

The cover 3 is, of course, applied and sealed to the plastics casing 6 after the other components have been placed within the casing 6. Thereafter, a metal sleeve 5 is fitted around the casing 6, and suitably shaped metal discs 2 and 13 are applied to opposite ends of the assembly and secured by beading over the ends of the metal sleeve 5, a washer 1 of insulating material being interposed between the top beading and the metal disc 2 and the lower end of the casing 6 being folded over by the beading and providing electrical insulation between the metal disc 13 and the metal sleeve 5. The metal disc 2, which makes contact with the carbon rod 10, constitutes the positive pole of the cell and the disc 13, which makes contact with the zinc peg or rivet 12, constitutes the negative pole.

The electrolyte paste used in this embodiment is prepared as follows:

(1) Electrolyte: Percent
    Zinc chloride _____ 25
    Ammonium chloride _____ 10
    Water _____ 65
(2) Depolarizer mass:
    Manganese dioxide _____ 60
    Acetylene black _____ 10
    Electrolyte _____ 30

The electrolyte solution according to the above formula and the depolarizer are vigorously masticated. The pressure for forming the depolarizer cake is approximately 30 kg./cm.$^2$ and in addition the compounding is carried out according to the paper-lined method in which gummed paper is used. The carbon rod is inserted into the zinc canister after the depolarizer paste has been suitably formed and surrounded with gummed paper. Finally the upper paper part is pressed so that gummed paper is moistened to a certain extent by the electrolyte solution in the depolarizer paste.

FIG. 2 shows the discharge curves of a cell according to the present invention (curve B) and of a high-capacity Leclanche dry cell type M2 (curve A) under a continuous discharge of 500 ma. It will be seen that a cell according to the invention has about twice the capacity of the high-capacity Leclanche cell.

FIG. 3 is a graph showing leakage of electrolyte over a period of time from cells according to the invention (curve B) and conventional high-capacity Leclanche cells (curve A). In the test a hundred batteries of each type were short-circuited. The graph shows the days and the number of leaky batteries. Of the batteries according to the invention (curve B), after a three-month short-circuit, not one single battery was observed to have leaked electrolyte, whilst of the conventional Leclanche batteries (curve A), from the 15th day leakage was noticeable in a number thereof, after two months 70% were leaking, and after 3 months in all the batteries (A) without exception leakage of electrolyte had occurred.

The above described fact can be explained in that with the cells according to the invention zinc hydroxide $Zn(OH)_2$ is produced if the batteries remain connected in circuit for some time after they have been discharged, so that the depolarizer paste hardens which further hinders leakage of electrolyte even if the cells remain connected in circuit for a very long time.

I claim:

1. A leak-resistant dry cell comprising a sealed enclosing casing of liquid impervious material, an electrode consisting of a thin-walled sleeve or canister of zinc within said casing, a carbon electrode within said zinc electrode and insulated therefrom, a depolarizer, and an electrolyte solution consisting essentially of water, zinc chloride as the main constituent other than said water, and ammonium chloride, said depolarizer and electrolyte solution being in the form of a depolarizer-electrolyte paste admixture and positioned between said electrodes, the zinc sleeve or canister terminating at the top of the paste in the cell and the quantity of zinc forming the zinc electrode being such that the zinc is substantially consumed so that the formation of hydrogen gas cannot thereafter occur by the time the cell voltage drops below its useful voltage, and the depolarizer becomes ineffective in preventing the escape of hydrogen gas, and anode and cathode terminal means outside said casing and connected to said electrodes respectively, the amounts of zinc chloride and ammonium chloride being sufficient to prevent formation of crystals of zinc diammonium chloride on said zinc.

2. A dry cell as claimed in claim 1, wherein the electrolyte solution comprises about 20–30% zinc chloride and about 5–20% ammonium chloride, these materials and the depolarizer being uniformly mixed to a paste having a water content of the order of 20–30%.

3. A dry cell as claimed in claim 1, wherein the electrode comprises a zinc canister from the base of which extends a peg or rivet which passes through an aperture in the bottom of the casing to provide connection to said cathode terminal means.

4. A dry cell as claimed in claim 1, wherein the enclosing casing is closed at its top by a cover member sealed thereto and through which the carbon anode projects.

5. A dry cell as claimed in claim 4, wherein the enclosing casing and cover member are made of polyethylene and heat-sealed together.

6. A dry cell as claimed in claim 1, wherein the enclosing casing is surrounded by a metal sleeve having inwardly extending beads at its ends to secure the metal sleeve on the casing, and wherein at least one of said anode and cathode terminal means comprises a metal disc at an end of the enclosing casing and secured by the bead at the adjacent end of the outer metal sleeve with insulating material interposed to insulate the metal disc from the outer metal sleeve.

7. A dry cell comprising a cylindrical casing moulded of plastics material with a bottom wall spaced above the bottom rim of the casing and having a central aperture, a cylindrical thin-walled zinc canister fitted within said casing, the base of said canister having a central downwardly projecting integral zinc pig extending through said central aperture and secured therein, a lining of gummed paper over the internal surfaces of the cylindrical wall and base of said canister, a depolarizer-electrolyte paste filling the space within said lining to a height approximately level with the top of the zinc canister, said paste comprising a depolarizer mixed with an electrolyte solution consisting essentially of water, zinc chloride as the main constituent other than said water, and ammonium chloride, a carbon rod inserted substantially vertically and centrally in said paste with its lower end insulated from the zinc canister by the lining and its upper end extending through a central aperture in a cover member of plastics material sealed to the top of said plastics casing, a paper disc covering the top of the depolarizer-electrolyte paste, a cylindrical metal sleeve surrounding said plastics casing, a first metal disc disposed in the space below the bottom wall of the plastics casing and secured therein in electrical contact with said zinc peg by the bottom rim of said plastics casing which is held in inwardly folded over the periphery of said first metal disc by a bead formed around the lower end of said metal sleeve, a bead around the top end of said metal sleeve, and a metal cap on the top of said carbon rod, the quantity of zinc forming said zinc canister being such that the zinc is substantially consumed so that formation of hydrogen gas cannot thereafter occur by the time the cell voltage drops below its useful voltage and the depolarizer becomes ineffective to prevent the escape of hydrogen gas, the amounts of zinc chloride and ammonium chloride being sufficient to prevent formation of crystals of zinc diammonium chloride on said zinc.

8. A dry cell as claimed in claim 7, wherein said metal cap forms part of a second metal disc of which the periphery is secured by said bead around the top end of said metal sleeve, with the interposition of insulating means between said second metal disc and said bead.

9. A dry cell as claimed in claim 7, wherein the depolarizer-electrolyte paste comprises zinc chloride, ammonium chloride, manganese dioxide, carbon black and water.

References Cited
UNITED STATES PATENTS

| | | | |
|---|---|---|---|
| 2,403,571 | 7/1946 | Wilke | 136—155 |
| 1,366,298 | 1/1921 | Teitelbaum | 136—103 |
| 3,019,141 | 1/1962 | Priebe | 136—155 |
| 3,060,256 | 10/1962 | Paulson | 136—155 |
| 3,440,104 | 4/1969 | Huber | 136—103 |
| 3,428,494 | 2/1969 | Watanabe et al. | 136—102 |
| 3,214,298 | 10/1965 | Urry | 136—107 |
| 3,297,488 | 1/1967 | Balaguer | 136—107 |

ALLEN B. CURTIS, Primary Examiner

C. F. LE FEVOUR, Assistant Examiner